United States Patent
Yamawaki et al.

(10) Patent No.: US 8,785,875 B2
(45) Date of Patent: Jul. 22, 2014

(54) POSITRON ANNIHILATION CHARACTERISTICS MEASUREMENT SYSTEM AND METHOD FOR MEASURING POSITRON ANNIHILATION CHARACTERISTICS

(75) Inventors: Masato Yamawaki, Tsukuba (JP);
Yoshinori Kobayashi, Tsukuba (JP);
Yoshihiro Watanabe, Yatomi (JP);
Kanehisa Hattori, Yatomi (JP)

(73) Assignees: National Institute of Advanced Industrial Science and Technology, Tokyo (JP); Toyo Seiko Co., Ltd., Aichi (JP)

( * ) Notice: Subject to any disclaimer, the term of this patent is extended or adjusted under 35 U.S.C. 154(b) by 323 days.

(21) Appl. No.: 13/302,496

(22) Filed: Nov. 22, 2011

(65) Prior Publication Data
US 2012/0153167 A1    Jun. 21, 2012

(30) Foreign Application Priority Data

Nov. 24, 2010  (JP) ................................ 2010-261626
Nov. 17, 2011  (JP) ................................ 2011-252066

(51) Int. Cl.
*G01T 1/00*   (2006.01)
*G01T 1/20*   (2006.01)

(52) U.S. Cl.
USPC ........................ 250/393; 250/394; 250/363.01

(58) Field of Classification Search
USPC .................................... 250/393, 394, 363.01
See application file for complete search history.

(56) References Cited

U.S. PATENT DOCUMENTS

| | | | |
|---|---|---|---|
| 7,420,166 B2* | 9/2008 | Naik et al. | 250/308 |
| 8,017,915 B2* | 9/2011 | Mazin | 250/363.04 |
| 2004/0075052 A1 | 4/2004 | Shirai et al. | |
| 2004/0173745 A1 | 9/2004 | Uedono et al. | |

FOREIGN PATENT DOCUMENTS

| | | | |
|---|---|---|---|
| JP | 05288694 A | 11/1993 | |
| JP | 10096702 A | 4/1998 | |
| JP | 2000266699 A | 9/2000 | |
| JP | 2001074673 A | 3/2001 | |
| JP | 2001116706 A | 4/2001 | |
| JP | 2001-264272 A | 9/2001 | |
| JP | 2002-014061 A | 1/2002 | |
| JP | 2002-090318 A | 3/2002 | |
| JP | 2003-050218 A | 2/2003 | |
| JP | 2003-215251 A | 7/2003 | |
| JP | 2003-270176 A | 9/2003 | |
| JP | 2004-028849 A | 1/2004 | |
| JP | 2004-093224 A | 3/2004 | |
| JP | 2005-331460 A | 12/2005 | |
| JP | 2006-177798 A | 7/2006 | |
| JP | 2007-178329 A | 7/2007 | |
| JP | 2009-008560 A | 1/2009 | |
| JP | 2009-229336 A | 10/2009 | |

\* cited by examiner

*Primary Examiner* — David Porta
*Assistant Examiner* — Mindy Vu
(74) *Attorney, Agent, or Firm* — Osha Liang LLP

(57) ABSTRACT

A positron annihilation characteristics measurement system 10 comprises a positron source; radiation detection means 14 for detecting radiation emitted when a positron generated by the positron source is annihilated; and a positron detector 40 that detects a positron that is not injected into a measured sample S after being generated by the positron source. The positron source is disposed between the measured sample S and the positron detector. An arithmetic device 50 calculates the annihilation characteristics of the positron in the measured sample S after eliminating the radiation that is detected by the radiation detection means 14 and is expected to be emitted when the positron detected by the positron detector 40 is annihilated.

6 Claims, 6 Drawing Sheets

POSITRON ANNIHILATION CHARACTERISTICS MEASUREMENT SYSTEM AND METHOD FOR MEASURING POSITRON ANNIHILATION CHARACTERISTICS

CROSS-REFERENCE

This application claims priority to Japanese Patent Application No. 2010-261626 filed on Nov. 24, 2010 and Japanese Patent Application No. 2011-252066 filed on Nov. 17, 2011, the contents of which are hereby incorporated by reference into the present application.

TECHNICAL FIELD

The present application relates to a technique for measuring annihilation characteristics of a positron that is injected into a measured sample and is annihilated in the measured sample.

DESCRIPTION OF RELATED ART

When a positron emitted from a $^{22}$Na and $^{68}$Ge positron source (positron emitting nuclide) enters a material, it travels through the material and then combines with an electron within the material. As a result, the positron and the electron annihilate each other. If the material has vacancies (defects), the positron is trapped at the vacancies and the trapped positron takes a longer time to annihilate as compared with a case where no vacancy exists. In addition, the vacancies (defects) in the material change an energy spectrum distribution of radiation (gamma ray) emitted when the positron annihilates, relative to the energy spectrum distribution obtained without vacancies. Accordingly, characteristics of the material having the vacancies (defects) can be estimated from how long it takes for the injected positron to annihilate and the energy spectrum distribution of the radiation upon the annihilation of the positron in the material. Thus, studies about assessment of shot peening and observation of fatigue of members used in a nuclear reactor by measuring positron annihilation characteristics have been made.

A known method for measuring positron annihilation characteristics comprises placing a positron source between two specimens that are cut out from a measured sample (measured material) to be measured, and measuring radiation (gamma ray) emitted following the positron annihilation. This method can provide measurement of the positron annihilation characteristics with high accuracy because all positrons emitted by the positron source are injected into the specimens. However, it is necessary for this method to cut out the specimens from the measured sample. No examination can be made without damaging the measured sample.

Thus, a method for measuring the positron annihilation characteristics of the measured sample without cutting out any specimen from the measured sample to be measured is suggested (Japanese Patent Application Publication No. 2004-28849). In the measurement method disclosed in Japanese Patent Application Publication No. 2004-28849, a positron detector is placed between the positron source and the measured sample and only the positron detected by the positron detector is injected into the measured sample, out of the positrons emitted by the positron source. Then, the radiation (gamma ray) emitted from a subsequent positron annihilation event is detected only when the positron is detected by the positron detector. A result of this detection is used to calculate the positron annihilation characteristics. The radiation (gamma ray) emitted upon annihilation of the positron that is not injected into the measured sample, out of the positrons emitted by the positron source is eliminated as a noise. As a result, the positron annihilation characteristics can be measured with high accuracy without placing the positron source between two specimens.

However, the aforementioned measurement method disclosed in Japanese Patent Application Publication No. 2004-28849 places the positron detector between the positron source and the measured sample. Some positrons are blocked by the positron detector, which reduces the number of the positrons injected by the positron source into the measured sample. In addition, the positron may be annihilated within the positron detector. Information about detection of the radiation (gamma ray) emitted from the positron annihilation event measured in such cases is a noise, which reduces the accuracy of measurement of the positron annihilation characteristics.

BRIEF SUMMARY OF INVENTION

It is an object of the present application to provide a technique with which positron annihilation characteristics can be measured with high accuracy without cutting out any specimen from a measured sample (measured material).

A positron annihilation characteristics measurement system disclosed in this specification measures annihilation characteristics of a positron that is injected into a measured sample and is annihilated in the measured sample. This positron annihilation characteristics measurement system comprises a positron source disposed at a position where the positron source is close to or adhered to a surface of the measured sample; a first radiation detector that detects radiation emitted when the positron generated by the positron source is annihilated; a positron detector that detects a positron that is not injected into the measured sample after being generated by the positron source; and an arithmetic device that calculates annihilation characteristics of the positron in the measured sample based on a detection result obtained by the first radiation detector and a detection result obtained by the positron detector. The positron source is disposed between the measured sample and the positron detector. The arithmetic device calculates the annihilation characteristics of the positron in the measured sample after eliminating the radiation that is detected by the first radiation detector and is expected to be emitted when the positron detected by the positron detector is annihilated.

In this positron annihilation characteristics measurement system, the positron that is not injected into the measured sample is detected by the positron detector. The radiation emitted when the positron that had not been injected into the measured sample is annihilated is eliminated as a noise. This allows calculation of the positron annihilation characteristics in the measured sample with high accuracy without covering the positron source with two specimens cut out from the measured sample. Further, no problem occurs even when the positron is annihilated in the positron detector because the positron detector only serves to detect the positron that had not been injected into the measured sample. In addition, no positron detector is placed between the positron source and the measured sample. The presence of the positron detector does not reduce the number of positrons injected into the measured sample.

DESCRIPTION OF EMBODIMENTS

Figure 1:
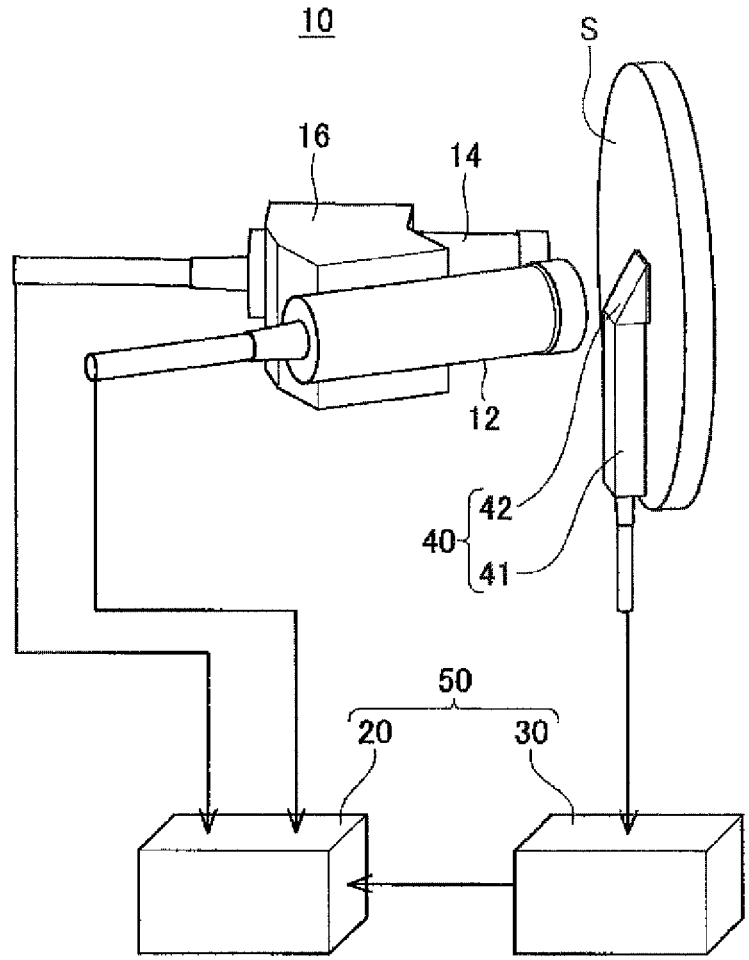
FIG. 1 shows a perspective view showing a configuration of a positron annihilation characteristics measurement system according to a first embodiment.

In one embodiment of a positron annihilation characteristics measurement system disclosed in this specification, the system may further comprise a second radiation detector that detects a radiation emitted when the positron is generated by the positron source. In this case, the arithmetic device may calculate the annihilation characteristics based on a lifetime of the positron obtained from a time difference between a time point at which the second radiation detector detects a radiation and a time point at which the first radiation detector detects a radiation. In addition, the arithmetic device may calculate the annihilation characteristics of the positron in the measured sample after eliminating a radiation that is detected by the second radiation detector and is expected to be emitted when the positron detected by the positron detector is generated. For example, the arithmetic device may eliminate the radiation detected by the first radiation detector to calculate the positron annihilation characteristics in the measured sample when a time difference between a time point at which the first radiation detector detects the radiation and a time point at which the positron detector detects the positron is equal to or smaller than a predetermined first time difference. Alternatively, the arithmetic device may eliminate the radiation detected by the second radiation detector to calculate the positron annihilation characteristics in the measured sample when a time difference between a time point at which the second radiation detector detects the radiation and a time point at which the positron detector detects the positron is equal to or smaller than a predetermined second time difference.

In addition, in another embodiment of the positron annihilation characteristics measurement system disclosed in this specification, the first radiation detector may measure energy of gamma ray produced When the positron is annihilated. In this case, the arithmetic device may calculate the annihilation characteristics of the positron in the measured sample from a distribution of energy spectrum of the gamma ray obtained from the detection result obtained by the first radiation detector. For example, the arithmetic device may eliminate the radiation detected by the first radiation detector to calculate the positron annihilation characteristics in the sample when a time difference between a time point at which the first radiation detector detects the radiation and a time point at which the positron detector detects the positron is equal to or smaller than a predetermined third time difference.

The positron detector may include a scintillator which emits scintillation light when struck by the positron; an optical sensor that detects the scintillation light emitted by the scintillator; and a light tight cover that restricts injection of light other than the scintillation light into the optical sensor. This configuration makes it possible to detect entrance of the positron into the scintillator with high accuracy. As a result, the positron that is not injected into the measured sample can be detected with high accuracy.

When the positron detector has the aforementioned configuration, the positron source may be a sheet coated with a positron emitting nuclide, and the sheet may be disposed so as to be adhered to the surface of the measured sample. In addition, the light tight cover may be adhered to the surface of the measured sample and cover the scintillator, the optical sensor, and the positron source. This configuration makes it possible to detect with high accuracy the positron that is not injected into the measured sample. The sheet coated with the positron emitting nuclide itself may have a light tight feature.

First Embodiment

Now, a positron annihilation characteristics measurement system 10 according to a first embodiment will be described. The positron annihilation characteristics measurement system 10 is a system to measure a positron lifetime in a measured sample from a time difference between a detection of a gamma ray (1.27 MeV) emitted simultaneously with the positron and a detection of a gamma ray (511 keV) emitted from a positron annihilation event. As shown in FIG. 1, the positron annihilation characteristics measurement system 10 comprises a first gamma ray detector 12, a second gamma ray detector 14, a positron detector 40, and an arithmetic device 50.

The first gamma ray detector 12 detects the gamma ray (1.27 MeV) emitted simultaneously with the positron. The first gamma ray detector 12 may comprise, for example, a scintillator which emits scintillation light when struck by the gamma ray and a photomultiplier which converts the scintillation light to an electrical signal. The first gamma ray detector 12 is connected to the arithmetic device 50. When the first gamma ray detector 12 detects the gamma ray (1.27 MeV) emitted simultaneously with the positron, the first gamma ray detector 12 supplies an electrical pulse to the arithmetic device 50.

The second gamma ray detector 14 detects the gamma ray (511 keV) emitted from the positron annihilation event. The second gamma ray detector 14 may have a similar setup to the first gamma ray detector 12. The second gamma ray detector 14 is connected to the arithmetic device 50. When the second gamma ray detector 14 detects the gamma ray (511 keV) emitted from the positron annihilation event, the second gamma ray detector 14 supplies an electrical pulse to the arithmetic device 50. The first gamma ray detector 12 and the second gamma ray detector 14 are mounted on a platform 16 and are opposed to each other with a surface to be measured of a measured sample S between them.

Figure 2:
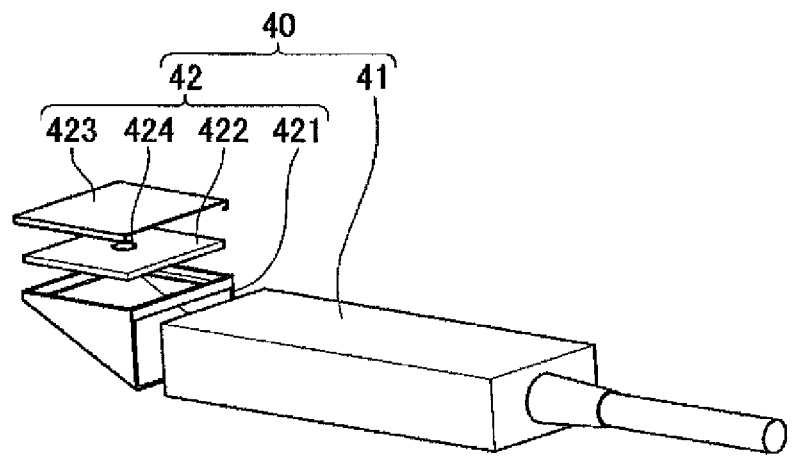
FIG. 2 is an exploded perspective view of a positron detection unit.

The positron detector 40 includes, as shown in FIG. 2, a photomultiplier 41, and a positron detection unit 42 attached to a light sensitive surface of the photomultiplier 41. The positron detection unit 42 has a positron source 424, a thin light tight cover 423, a scintillator 422 for positron detection, and a light collector 421. The thin light tight cover 423 blocks any outside light from entering the scintillator 422. Upon measurement, the thin light tight cover 423 is adhered to the surface to be measured of the measured sample S. The scintillator 422 emits the scintillation light as the positron travels through it. The light collector 421 collects the scintillation light emitted by the scintillator 422 and focuses it onto the light sensitive surface of the photomultiplier 41. The photomultiplier 41 converts the scintillation light collected by the light collector 421 into an electrical signal. The electrical signal from the photomultiplier 41 is supplied to the arithmetic device 50.

The positron source 424 is placed between the thin light tight cover 423 and the scintillator 422. In other words, the positron source 424 sandwiched between the thin light tight cover 423 and the scintillator 422. As a result, the positron emitted from the positron source 424 is directed either to the thin light tight cover 423 or to the scintillator 422. When the positron is directed to the thin light tight cover 423, the positron passes through the thin light tight cover 423 and is injected into the measured sample S. On the other hand, when the positron is directed to the scintillator 422, the scintillation light is emitted from the scintillator 422 and the positron is annihilated inside the scintillator 422 or outside the scintillator 422 (i.e., other than the measured sample S). The scintillation light from the scintillator 422 is incident on the photomultiplier 41 through the light collector 421. Accordingly, an electrical signal is supplied from the photomultiplier 41 to the arithmetic device 50.

It is noted that a $^{22}$Na and $^{68}$Ge positron source (positron emitting nuclide) may be used for the positron source 424. In addition, the positron source 424 is a weak positron source with which no positron is generated during the interval between generation and annihilation of one positron. Thus, it is possible to avoid a case that two or more positrons existing simultaneously prevent identification of the time points when the positron is generated and is annihilated.

The arithmetic device 50 may comprise a computer or a processor having a CPU, an ROM, and an RAM and a dedicated circuit such as a digital oscilloscope or an NMI module. The arithmetic device 50 has a first signal processing unit 20 connected to the first gamma ray detector 12 and the second gamma ray detector 14, and a second signal processing unit 30 connected to the positron detector 40. The second signal processing unit 30 may be implemented using, for example, a digital oscilloscope or a discriminator. Alternatively, the second signal processing unit 30 may be configured using a computer or a processor that executes a signal processing program. The second signal processing unit 30 processes an electrical signal supplied from the positron detector 40 (more specifically, the photomultiplier 41) to determine the time point at which the positron is injected into the positron detector 40. The time point determined by the second signal processing unit 30 is supplied to the first signal processing unit 20.

The first signal processing unit 20 may be configured using, for example, a digital oscilloscope and a processor or a computer that executes a program to process a signal received by the digital oscilloscope. Alternatively, a combination of a constant fraction discriminator (CFD), a time-to-amplitude converter (TAC), and a multi-channel analyzer (MCA) may be used to configure the first signal processing unit 20. While the first signal processing unit 20 and the second signal processing unit 30 are configured separately in this embodiment, but the present teachings are not limited thereto. Alternatively, the first signal processing unit 20 and the second signal processing unit 30 may be formed integrally with each other. More specifically, all signals may be recorded using the digital oscilloscope, and the recorded signals may be processed using a computer or a processor.

Figure 3:
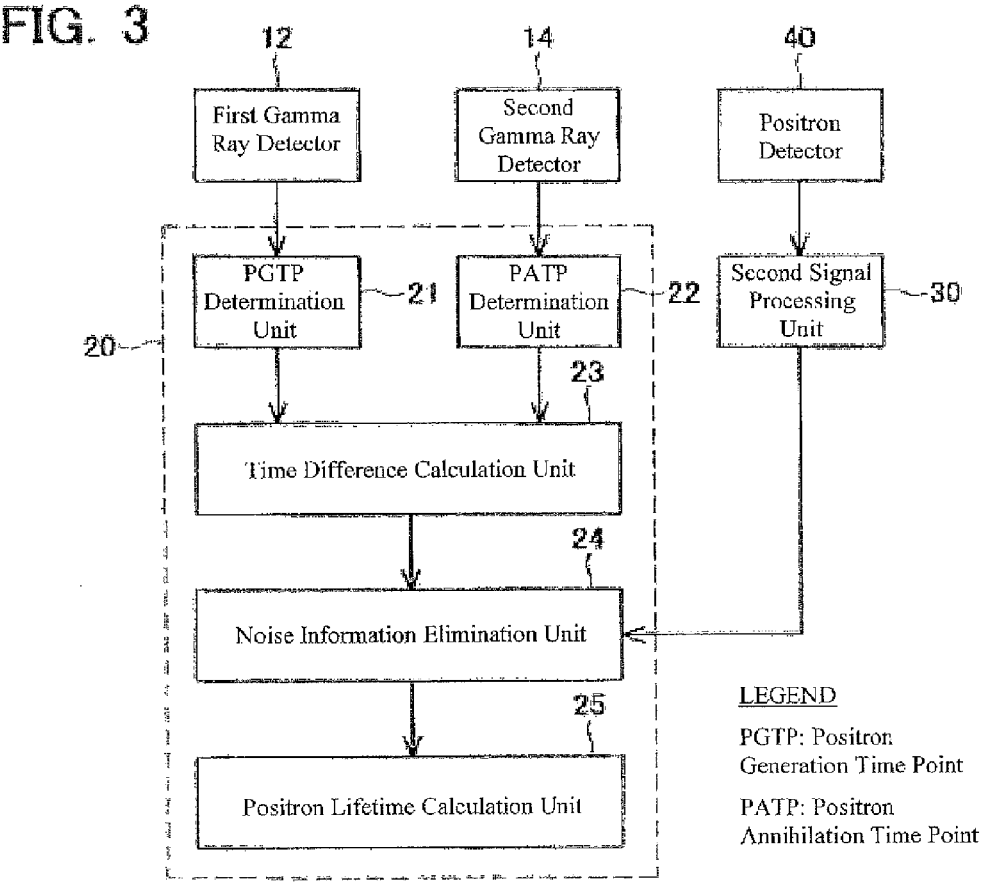
FIG. 3 is a functional block diagram showing a configuration of an arithmetic device.

The first signal processing unit 20 has, as shown in FIG. 3, a positron generation time point determination unit 21, a positron annihilation time point determination unit 22, a time difference calculation unit 23, a noise information elimination unit 24, and a positron lifetime calculation unit 25, as functions thereof. The positron generation time point determination unit 21 determines a time point at which the positron is generated by the positron source 424, according to the signal supplied from the first gamma ray detector 12. The positron annihilation time point determination unit 22 determines a time point at which the positron is annihilated, according to the signal supplied from the second gamma ray detector 14. The time difference calculation unit 23 calculates a time period during which the positron is present, by using a time difference between the time point determined by the positron generation time point determination unit 21 and the time point determined by the positron annihilation time point determination unit 22. The positron generation time point determination unit 21, the positron annihilation time point determination unit 22, and the time difference calculation unit 23 may be configured similar to corresponding components in a conventional known positron annihilation characteristics measurement system.

Figure 4A:
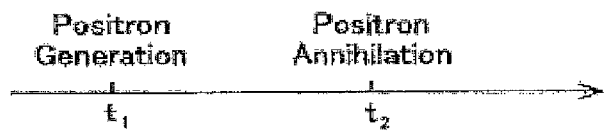
FIG. 4 is a view (part 1) for illustrating a procedure to eliminate a noise based on a detection result obtained by a positron detection unit.
Figure 4B:
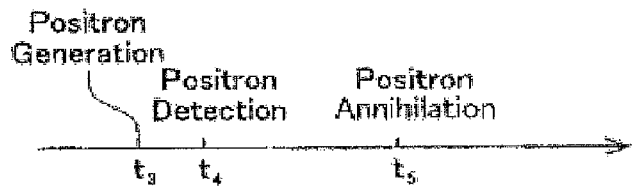
Figure 5:
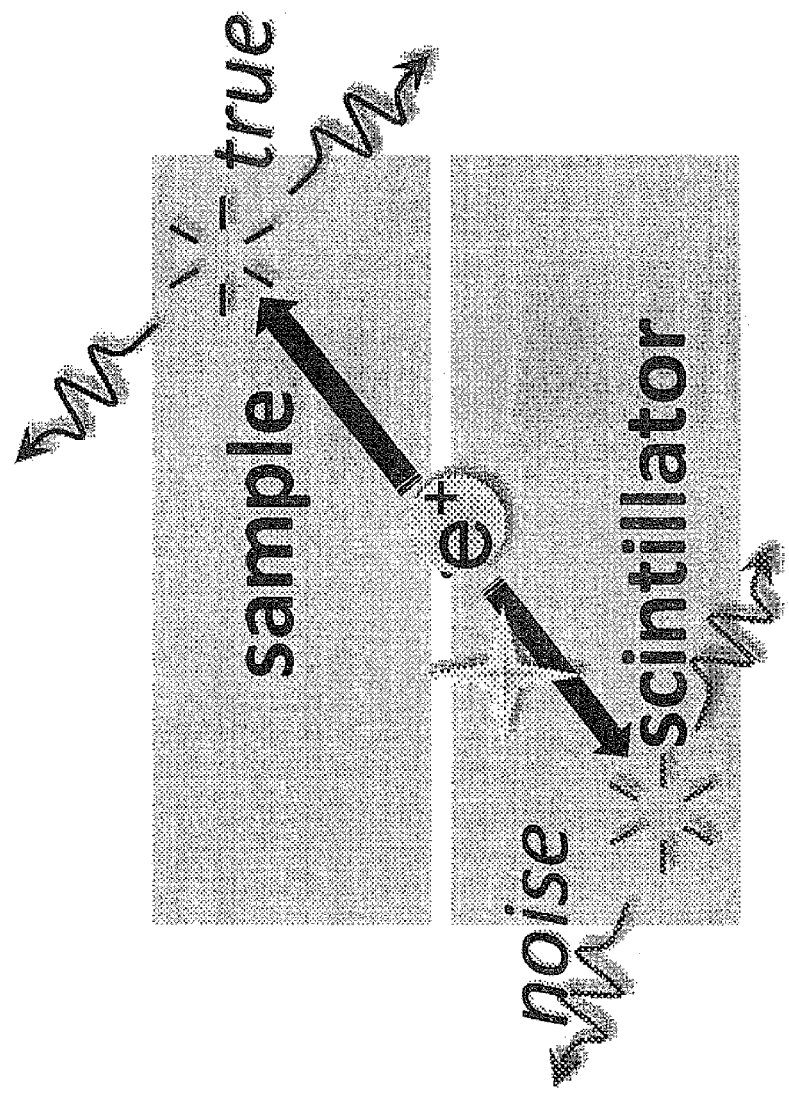
FIG. 5 is a view (part 2) for illustrating a procedure to eliminate a noise based on a detection result obtained by the positron detection unit.

The noise information elimination unit 24 eliminates a component associated with the positron that is not injected into the measured sample S, of the time difference calculated by the time difference calculation unit 23 by using the time point determined by the second signal processing unit 30 (i.e., the time point at which the positron is injected into the scintillator 422). More specifically, as shown in FIG. 5, when the positron emitted by the positron source 424 is injected into the measured sample S (sample), it is annihilated within the measured sample to produce the gamma ray (511 keV). On the other hand, when the positron emitted by the positron source 424 is injected into the scintillator 422, the scintillation light is produced and it is annihilated outside the measured sample S to produce the gamma ray (511 keV). Thus, if the gamma ray (1.27 MeV) indicating the production of the positron is detected, subsequently the scintillation light is detected, and then the gamma ray (511 keV) indicating the occurrence of a positron annihilation event is detected, it can be determined that the positron emitted by the positron source 424 is injected into the scintillator 422. On the other hand, if the gamma ray (1.27 MeV) indicating the production of the positron is detected, and then the gamma ray (511 keV) indicating the occurrence of a positron annihilation event is detected without detection of any scintillation light, it can be determined that the positron emitted by the positron source 424 is injected into the measured sample S (sample). For example, as shown in FIG. 4A, when no positron is detected by the positron detector 40 between a positron generation time point t1 and a positron annihilation time point t2 (i.e., when no scintillation light is detected), the positron generation time point t1 and the positron annihilation time point t2 are considered as valid data. A time difference (t2−t1) between them is used to calculate the lifetime of the positron in the measured sample S. On the other hand, as shown in FIG. 4B, when the positron is detected by the positron detector 40 at a time point t4 between a positron generation time point t3 and a positron annihilation time point t5 (i.e., when the scintillation light is detected), the positron generation time point t3 and the positron annihilation time point t5 are considered as invalid data and are excluded from data to be used for calculating the lifetime of the positron in the measured sample S. It should be noted that the generation of the positron (the time point t3), the detection of the positron (the time point t4), and the annihilation of the positron (the time point t5) occur during a very short period of time. Accordingly, when the time difference between the positron generation time point t3 and the positron detection time point t4 is equal to or smaller than a predetermined first time difference, the positron generation time point t3 and the positron annihilation time point t5 detected subsequently may be excluded as the invalid data. Alternatively, when the time difference between the positron detection time point t4 and the positron annihilation time point t5 is equal to or smaller than a predetermined second time difference, the positron generation time point t3 and the positron annihilation time point t5 may be excluded as the invalid data.

The positron lifetime calculation unit 25 calculates the lifetime of the positron in the measured sample S based on a survival time of the positron that is injected into the measured sample S after a noise is eliminated therefrom in a noise information elimination unit 22. The positron lifetime calculation unit 25 may be configured as in a case of corresponding components in a conventional known positron annihilation characteristics measurement system.

Next, description will be given on a procedure to measure the positron lifetime in the measured sample S using the aforementioned positron annihilation characteristics measurement system 10. First, the positron detector 40 is disposed in place relative to the measured sample S. More specifically, the positron detector 40 is attached to the measured sample S in such a manner that the thin light tight cover 423 is brought into contact with the surface to be measured of the measured sample S. As a result, the positron source 424 is sandwiched between the measured sample S and a position detection unit (the scintillator 422). Next, the first gamma ray detector 12 and the second gamma ray detector 14 are disposed in place at positions opposite to the measured sample S. After the first gamma ray detector 12 and the second gamma ray detector 14 are disposed, the arithmetic device 50 is activated to start measurement of the positron lifetime.

When the positron is generated by the positron source 424, the gamma ray (1.27 MeV) emitted simultaneously with the positron is detected by the first gamma ray detector 12. The first signal processing unit 20 determines the time point at which the positron is generated, according to the signal supplied from the first gamma ray detector 12. The positron generated by the positron source 424 is directed either to the measured sample S or to the scintillator 422. The positron injected into the measured sample S combines with an electron and is annihilated after lapse of an appropriate period of time, producing the gamma ray (511 keV). This gamma ray (511 keV) is detected by the second gamma ray detector 14. The first signal processing unit 20 determines the time point at which the positron is annihilated, according to the signal supplied from the second gamma ray detector 14. It then calculates the survival time of the positron using that time difference.

On the other hand, the positron injected into the scintillator 422 produces the scintillation light and is then annihilated outside the measured sample S, producing the gamma ray (511 keV). The scintillation light is collected on the light sensitive surface of the photomultiplier 41 through the light collector 421 and is converted into an electrical signal by the photomultiplier 41. The second signal processing unit 30 determines the time point at which the positron is injected into the scintillator 422, according to the electrical signal supplied from the photomultiplier 41. The gamma ray (511 keV) produced when the positron is annihilated outside the measured sample S is detected by the second gamma ray detector 14. In this way, even when the positron is not injected into the measured sample S, the first signal processing unit 20 calculates the time difference. However, the data about the positron that is not injected into the measured sample S is excluded because of a relationship between the time point calculated by the second signal processing unit 30, a positron generation time point, and a positron annihilation time point. Thus, the first signal processing unit 20 calculates the lifetime of the positron only according to the data obtained from the positron injected into the measured sample S.

As apparent from the aforementioned description, in the positron annihilation characteristics measurement system 10 in this embodiment, the positron that is not injected into the measured sample S is detected by the positron detector 40 and any radiation produced by the positron that is not injected into the measured sample S is eliminated as a noise. As a result, positron annihilation characteristics of the measured sample S can be calculated with high accuracy without sandwiching the positron source 424 with the measured sample S. In addition, the scintillator 422 for the positron detection is not placed between the positron source 424 and the measured sample S, which contributes to preventing the positron injected into the measured sample S from decreasing.

Figure 6:
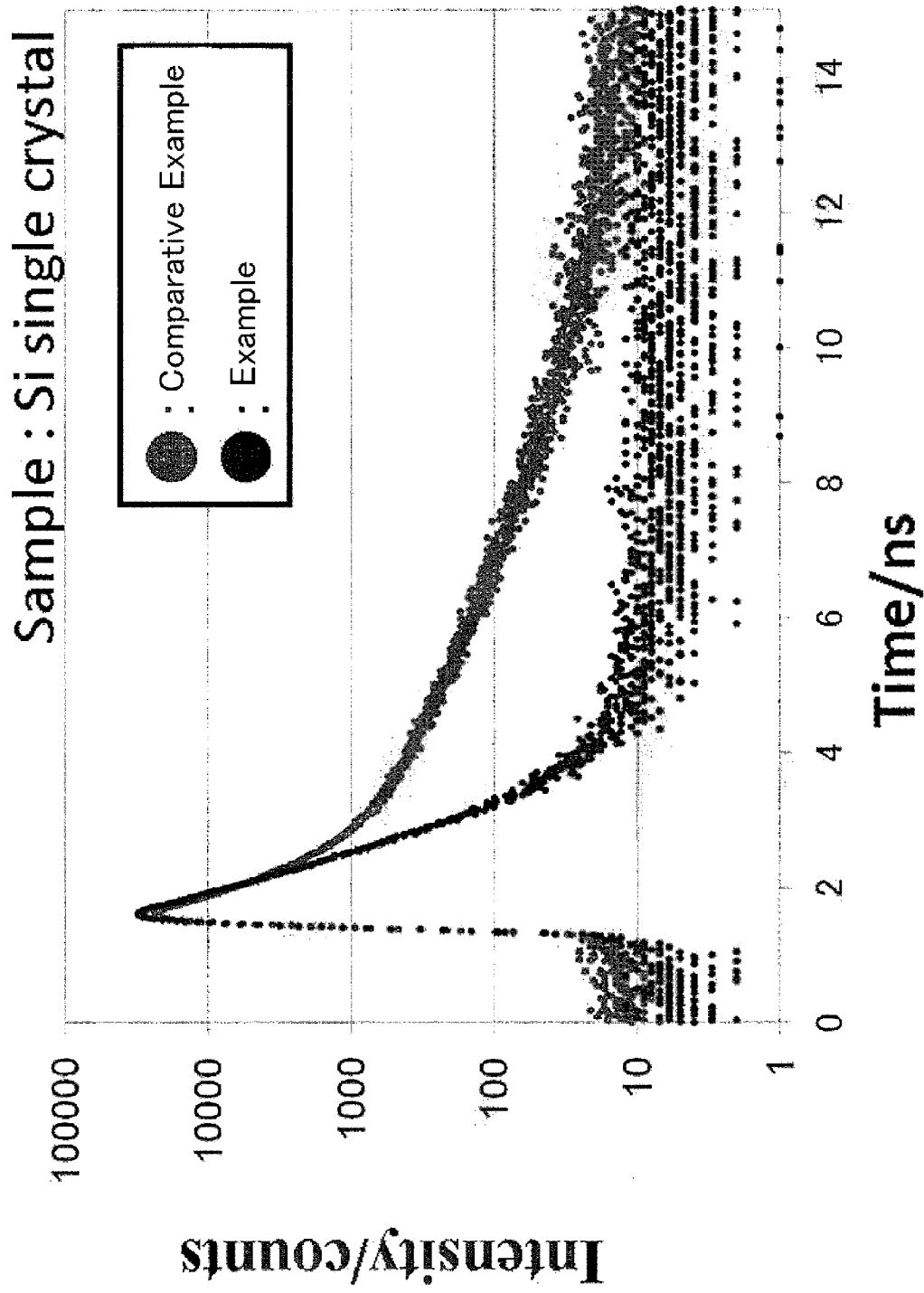
FIG. 6 is a view showing an example of positron lifetime measurement.

Now, an exemplified measurement result for the positron lifetime will be described with reference to FIG. 6. In FIG. 6, the example shows a measurement result after elimination of the data (noise) obtained from the positron detected by the positron detector 40. On the other hand, a comparative example shows a measurement result given without eliminating the data (noise) obtained from the positron detected by the positron detector 40. As apparent from FIG. 6, the comparative example does not eliminate the data obtained from the positron detected by the positron detector 40, so that the lifetime of the positron that is not injected into the measured sample S is included. The measurement result thus contains a large number of noise components. On the other hand, the example eliminates the lifetime data for the positron that is not injected into the measured sample S, so that the noise component is removed from the measurement result.

While, in the aforementioned embodiment, the gamma ray (1.27 MeV) emitted simultaneously with the positron and the gamma ray (511 keV) emitted from the positron annihilation event are detected by using the different gamma ray detectors, but the present teachings are not limited to this configuration. For example, the gamma ray (1.27 MeV) emitted simultaneously with the positron and the gamma ray (511 keV) emitted from the positron annihilation event may be detected by using a single gamma ray detector and these may be processed to obtain the positron generation time point, the annihilation time point, and the time difference therebetween.

Second Embodiment

Figure 7:
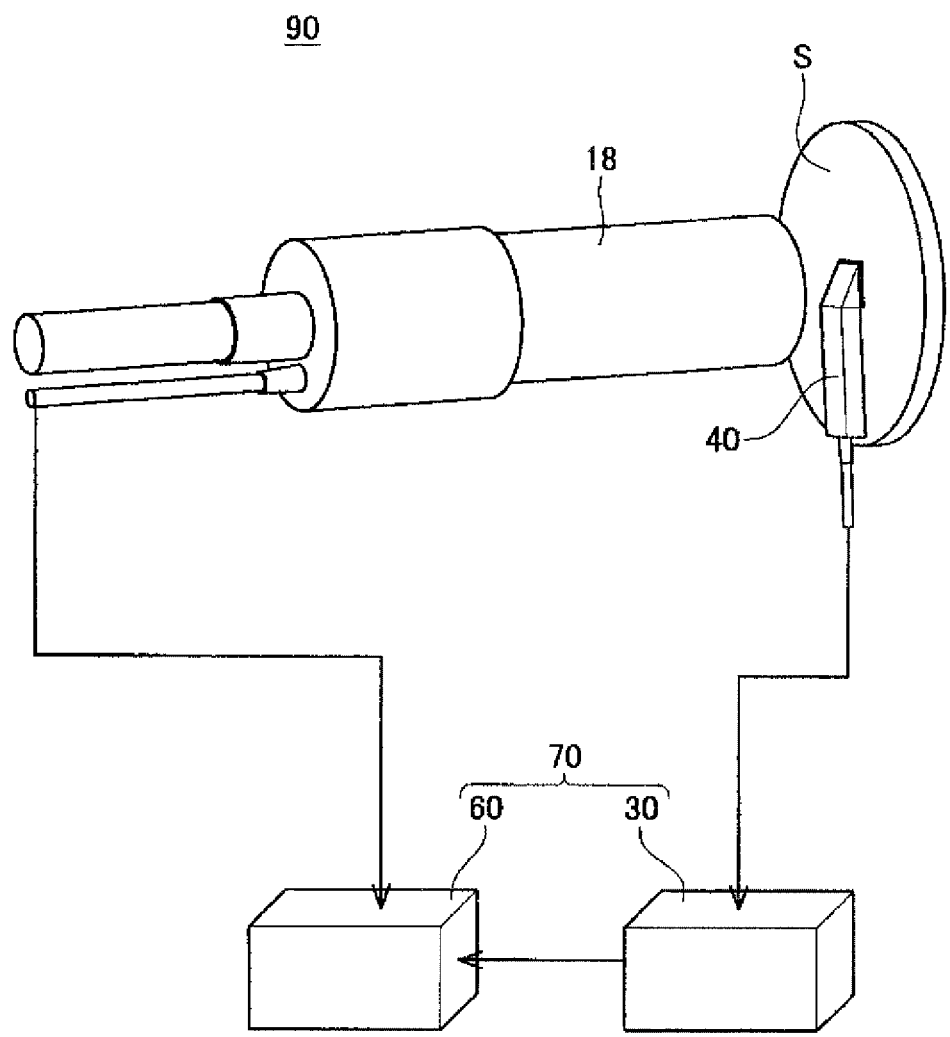
FIG. 7 is a perspective view showing a configuration of a positron annihilation characteristics measurement system according to a second embodiment.

A positron annihilation Characteristics measurement system 90 according to a second embodiment is a device that detects the energy of the gamma ray emitted from the positron annihilation event and calculates a Doppler broadening of a measured sample from a spectral distribution of the energy of the detected gamma ray. As shown in FIG. 7, the positron annihilation characteristics measurement system 90 has a gamma ray detector 18, the positron detector 40, and an arithmetic device 70. The positron detector 40 and the second signal processing unit 30 composing the arithmetic device 70 are identical in configuration to the corresponding components in the first embodiment. Thus, only differences from the first embodiment will be described.

The gamma ray detector 18 detects energy of the gamma ray (511 keV) emitted from the positron annihilation event. A GeSSD may be used for the gamma ray detector 18. The gamma ray detector 18 is disposed at a position opposite to the measured sample S in such a manner that the positron detector 40 is sandwiched between the gamma ray detector 18 and the measured sample S. The energy detected by the gamma ray detector 18 is supplied to a third signal processing unit 60.

Figure 8:
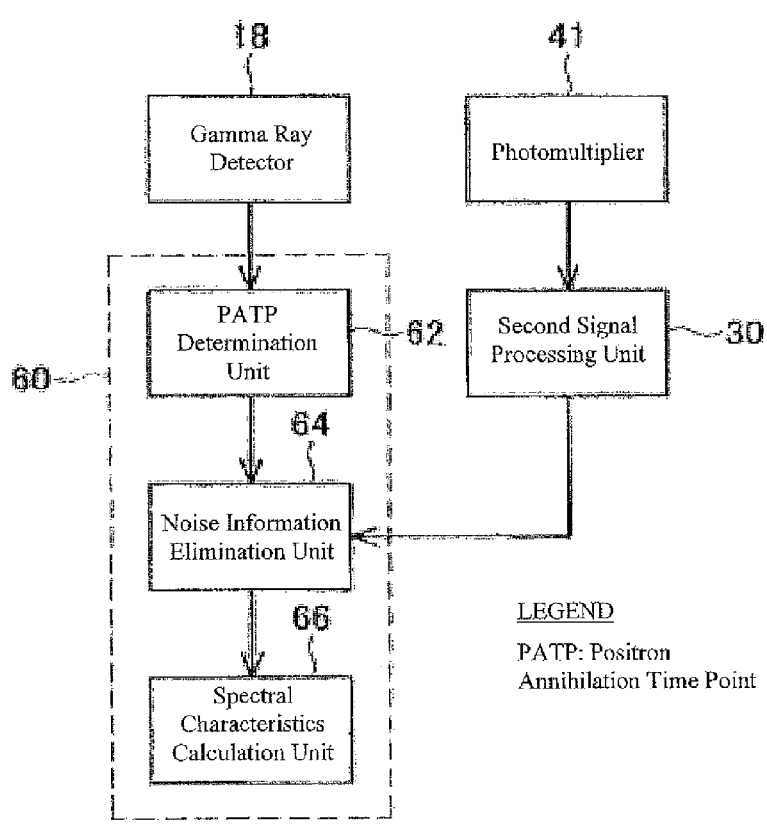
FIG. 8 is a functional block diagram showing a configuration of an arithmetic device according to the second embodiment.
Figure 9:
FIG. 9 is a view for illustrating a procedure to eliminate a noise based on a detection result obtained by the positron detection unit in the positron annihilation characteristics measurement system according to the second embodiment.

The third signal processing unit 60 has, as shown in FIG. 8, a positron annihilation time point determination unit 62, a noise information elimination unit 64, and a spectral characteristics calculation unit 66. The positron annihilation time point determination unit 62 determines a time point at which the positron is annihilated, according to a signal supplied from the gamma ray detector 18. The noise information elimination unit 64 determines whether the detected gamma ray is emitted when the positron is annihilated in the measured sample S or when the positron is annihilated outside the measured sample S, by using the time point determined by the second signal processing unit 30 (i.e., the time point at which the positron is injected into the scintillator 422) and the annihilation time point determined by the positron annihilation time point determination unit 62. When the noise information elimination unit 64 determined that the positron is annihilated outside the measured sample S, it eliminates the associated data from the data for calculating spectral characteristics. More specifically, the noise information elimination unit 64 excludes, from the data, annihilation of the positron occurred just after the time point at which the positron is detected by the positron detector 40 as the annihilation of the positron outside the measured sample S. For example, as shown in FIG. 9, it is assumed that the positron is detected at a time point t1, and annihilation of the positron is detected at time points t2 and t3. In this case, the annihilation of the positron at the time point t2 is determined as the annihilation of the positron outside the measured sample S, and the annihilation of the positron at the time point t3 is determined as the annihilation of the positron in the measured sample S. The data associated with the positron annihilation outside the measured sample S are excluded from the data for calculating the spectral characteristics. The spectral characteristics calculation unit 66 calculates an energy spectral distribution of the gamma ray for the data from which a noise is eliminated by the noise information elimination unit 64, and calculates an S parameter according to this energy spectral distribution.

It should be noted that the positron detection (the time point t1) and the positron annihilation (the time point t2) shown in FIG. 9 occur during a very short period of time. Thus, the noise information elimination unit 64 may exclude, as invalid data, the data of the gamma ray at the positron annihilation time point t2 when a time difference between the positron detection time point t1 and the positron annihilation time point t2 is equal to or smaller than a predetermined third time difference.

As apparent from the aforementioned description, the positron annihilation characteristics measurement system 90 according to the second embodiment also detects the positron that is not injected into the measured sample S by the positron detector 40, and eliminates, as the noise, the radiation produced when the positron that is not injected into the measured sample S is annihilated. As a result, the positron annihilation characteristics of the measured sample S (the S parameter) can be calculated with high accuracy without sandwiching the positron source 424 with the measured sample S.

While the specific examples of the present invention have been described in detail, they are illustrative only and do not limit the scope of the claims. Techniques described in the claims encompass various modifications and variations of the aforementioned illustrative specific examples.

Technical features described in this specification or the drawings produce technical usability alone or in various combinations, and are not limited to combinations disclosed in the claims as filed. In addition, techniques exemplified in this specification or the drawings can achieve two or more objects at the same time, and have technical usability by achieving one of these objects.

What is claimed is:

1. A positron annihilation characteristics measurement system for measuring annihilation characteristics of a positron that is injected into a measured sample and is annihilated in the measured sample, the system comprising:
   a positron source disposed at a position where the positron source is close to or adhered to a surface of the measured sample;
   a first radiation detector that detects radiation emitted when the positron generated by the positron source is annihilated;
   a positron detector that detects a positron that is not injected into the measured sample after being generated by the positron source; and
   an arithmetic device that calculates annihilation characteristics of the positron in the measured sample based on a detection result obtained by the first radiation detector and a detection result obtained by the positron detector, wherein
   the positron source is disposed between the measured sample and the positron detector, and
   the arithmetic device calculates the annihilation characteristics of the positron in the measured sample after eliminating a radiation that is detected by the first radiation detector and is expected to be emitted when the positron detected by the positron detector is annihilated.

2. The positron annihilation characteristics measurement system according to claim 1, further comprising a second radiation detector that detects a radiation emitted when the positron is generated by the positron source,
   wherein the arithmetic device calculates the annihilation characteristics based on a lifetime of the positron obtained from a time difference between a time point at which the second radiation detector detects a radiation and a time point at which the first radiation detector detects the radiation, and
   the arithmetic device calculates the annihilation characteristics of the positron in the measured sample after eliminating a radiation that is detected by the second radiation detector and is expected to be emitted when the positron detected by the positron detector is generated.

3. The positron annihilation characteristics measurement system according to claim 2, wherein the positron detector includes:
   a scintillator that emits scintillation light when struck by the positron;
   an optical sensor that detects the scintillation light emitted by the scintillator; and
   a light tight cover that restricts injection of light other than the scintillation light into the optical sensor.

4. The positron annihilation characteristics measurement system according to claim 3, wherein
   the positron source is a sheet coated with a positron emitting nuclide, the sheet being disposed so as to be adhered to the surface of the measured sample, and
   the light tight cover is adhered to the surface of the measured sample and covers the scintillator, the optical sensor, and the positron source.

5. The positron annihilation characteristics measurement system according to claim 1, wherein
the first radiation detector measures energy of gamma ray produced when the positron is annihilated, and
the arithmetic device calculates the annihilation characteristics of the positron in the measured sample from a distribution of energy spectrum of the gamma ray obtained from the detection result obtained by the first radiation detector.

6. A positron annihilation characteristics measurement method for measuring annihilation characteristics of a positron that is injected into a measured sample and is annihilated in the measured sample, comprising:
a step of disposing a positron source at a position where the positron source is close to or adhered to a surface of the measured sample, and disposing a positron detector in such manner that the positron source is placed between the measured sample and the positron detector;
a detection step of detecting, by radiation detecting means, a radiation emitted when the positron generated by the positron source is annihilated, alter the positron source and the positron detector are disposed relative to the measured sample, and detecting, by the positron detector, the positron that is not injected into the measured sample after being generated by the positron source; and
a calculation step of calculating annihilation characteristics of the positron in the measured sample based on a detection result obtained by the radiation detection means and a detection result obtained by the positron detector in the detection step,
wherein the calculation step calculates the annihilation characteristics of the positron in the measured sample after eliminating radiation that is detected by the radiation detection means and is expected to be emitted when the positron detected by the positron detector is annihilated.

* * * * *